United States Patent
Bernd et al.

(10) Patent No.: US 6,216,525 B1
(45) Date of Patent: Apr. 17, 2001

(54) DISTRIBUTIVE RETARDER TEST DEVICE

(75) Inventors: John J. Bernd, Wauwatosa; Richard C. Bohme, Racine, both of WI (US)

(73) Assignee: AAA Sales & Engineering, Inc., Oak Creek, WI (US)

( * ) Notice: Subject to any disclaimer, the term of this patent is extended or adjusted under 35 U.S.C. 154(b) by 0 days.

(21) Appl. No.: 09/212,235

(22) Filed: Dec. 16, 1998

(51) Int. Cl.$^7$ ................................................. G01H 13/00
(52) U.S. Cl. ......................................................... 73/11.06
(58) Field of Search .............................. 73/11.06, 11.01, 73/12.06, 12.07

(56) References Cited

U.S. PATENT DOCUMENTS

| | | |
|---|---|---|
| 2,660,879 | 12/1953 | Allen . |
| 3,410,131 | 11/1968 | Roesel . |
| 3,872,716 * | 3/1975 | Hansen ................................ 73/81 |
| 4,155,547 * | 5/1979 | Savio et al. ......................... 272/67 |
| 4,314,473 | 2/1982 | Sulzer . |
| 4,721,189 * | 1/1988 | Bick ...................................... 188/62 |
| 5,325,700 | 7/1994 | Litten . |
| 5,351,562 | 10/1994 | Scott . |
| 5,485,742 * | 1/1996 | Litten .................................. 73/11.06 |
| 5,730,260 | 3/1998 | Thyssen . |

* cited by examiner

Primary Examiner—Benjamin R. Fuller
Assistant Examiner—Jewel V. Thompson
(74) Attorney, Agent, or Firm—Andrus, Sceales, Starke & Sawall, LLP

(57) ABSTRACT

A testing device is provided for checking the resistive force of a retarder installed on the rail of a railway track for reducing the speed of a railcar rolling along the track. The retarder is a hydraulic unit including a housing, a cylinder slidably mounted in the housing, a piston rod fixed to the housing, a piston assembly fixed to the piston rod and dividing the cylinder into upper and lower chambers, and a valve arrangement responsive to the flow of hydraulic fluid flowing between the upper and lower chambers. The testing device is constructed and arranged to allow a user to check the resistive force of a retarder installed upon the railway track while standing in an upright position.

17 Claims, 3 Drawing Sheets

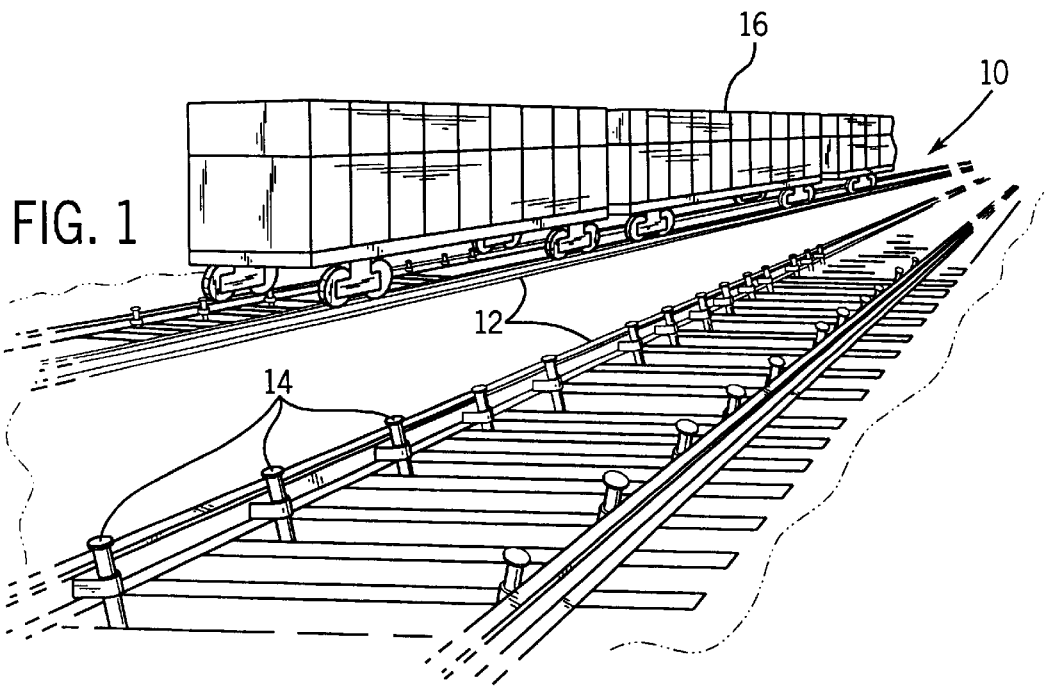
FIG. 1
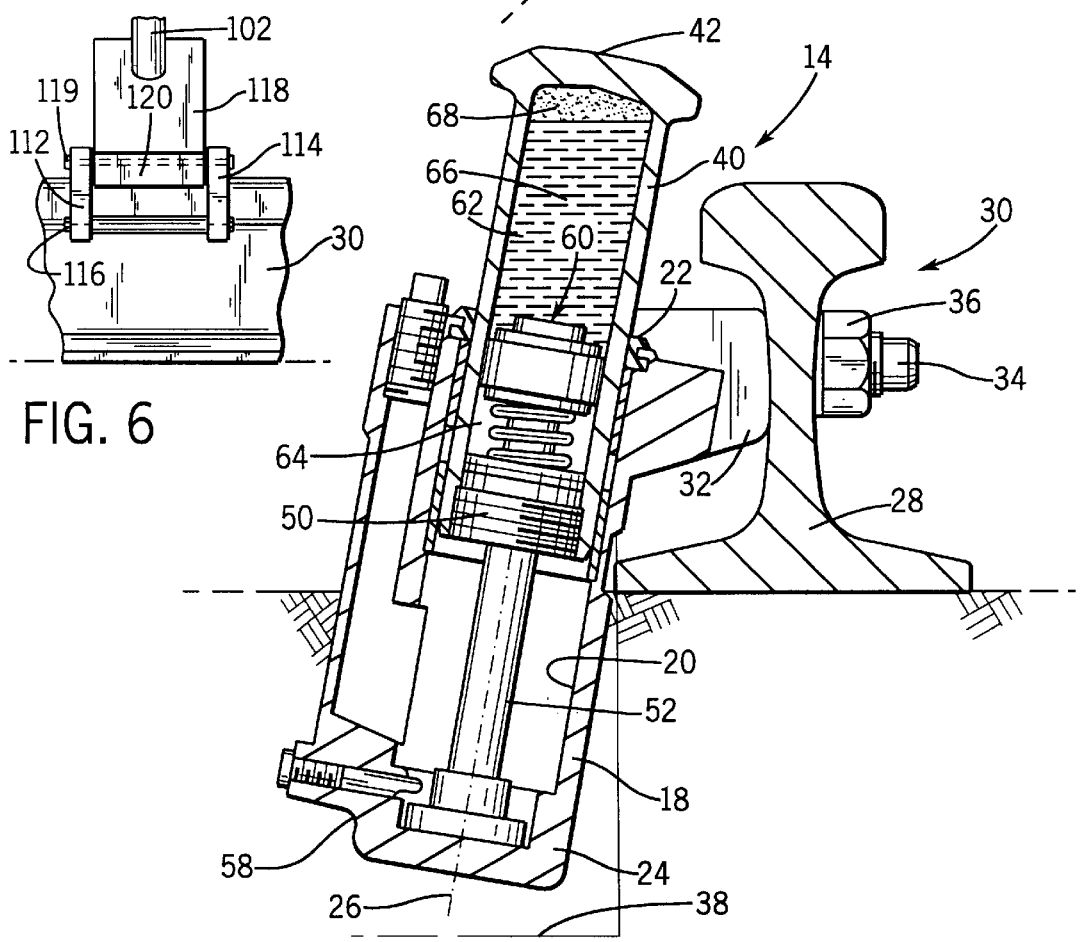
FIG. 6
FIG. 2

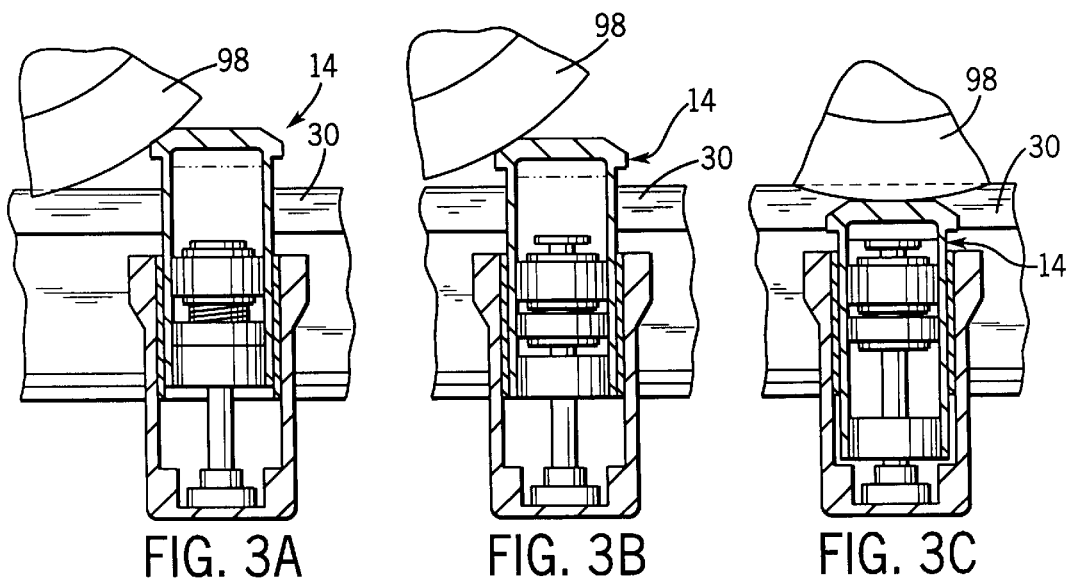
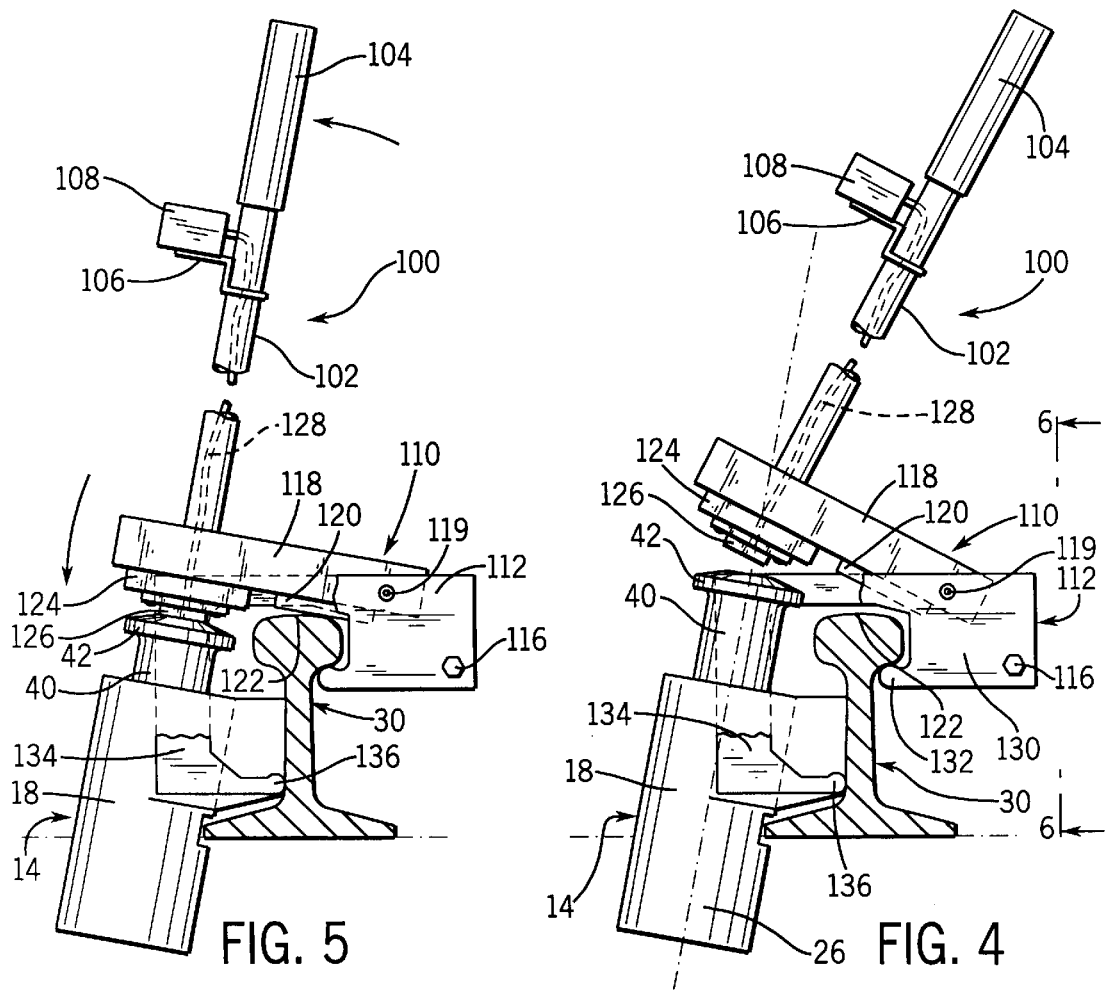

DISTRIBUTIVE RETARDER TEST DEVICE

FIELD OF USE

This invention relates generally to retarders of the kind suitable for reducing the speed of a railcar traveling upon a set of tracks, and more particularly, pertains to a field testing device used to measure a resistive force in a retarder installed on the set of railway tracks.

BACKGROUND OF THE INVENTION

Railcar retarders are utilized in railway classification yards in conjunction with a "hump" over which a string of cars is pushed. The railcars are then individually, or in groups, allowed to accelerate down the hump and through appropriate switching networks to their ultimate destination. As the cars accelerate down the hump, it is necessary to maintain the speed of travel under certain limits in accordance with the railcars rolling resistance, distance to be traveled and various other factors. Because light railcars must usually be given the greatest acceleration to reach their most distant location in a classification yard, the hump is built high enough, or the yard is profiled, to cause light railcars to reach a sufficient velocity to carry them to their furthest point. Railcar retarders are then added to reduce the speed of the heavier cars, so that the railcars will not be damaged and will not be subject to excessive wheel lift and derailment.

One type of retarder exhibits a shock absorber-like construction which is mounted at various intervals to the rails in a yard. Such retarders are comprised of a hydraulic unit which exerts a variable resistive force upon deflection of a portion of the unit by the outer edge or flange of a wheel rolling over the rail. To ensure proper function of the retarders, it is necessary for the performance of the retarders to be periodically tested once the retarders have been installed on the tracks.

Heretofore, the most fundamental method of field testing retarders was effected by a maintenance person using his or her foot to compress the retarder and develop a "feel" to determine if the installed retarder has enough resistance. This method is unsafe, inaccurate, and unsanctioned in many classification yards.

A spring-loaded lever device exists for the purpose of measuring the resistive force in a retarder. The spring is compressed on a color-coded cylinder to give a rough measure of the resistive force left in the retarder. The existing tester requires that the user clear ballast under the base of the rail, slide a hinged lever arm under the base of the rail and rotate the device over the retarder and head of the rail. The user then pushes down on a handle and tries to read the color code located on the cylinder. All of this is done with the user crouching very close to ground level, approximately 7 inches thereabove. Normally there are hundreds of retarders to test on a single track in a classification yard. By using this existing method, this prior art device would take upward of two minutes to check one retarder.

Until this invention, no accurate method of checking the resistive force in an installed retarder was available. With the introduction of the spring-loaded lever device, an individual retarder could be checked. However, this method was cumbersome, inaccurate and impractical for checking a large population of retarders. This prior art device also could only check one brand of retarders, so that it had very limited application. Before the invention, the only way to find a "bad" retarder, or to check the condition of any retarder, was to remove the retarder from service and somehow push on it and then using an educated guess, determine whether the unit is acceptable or unacceptable.

Accordingly, it is desirable to provide an on-site testing device and method which allows for repeatable preventive maintenance by safely and accurately testing the amount of resistive force left in an installed retarder. It is also desirable to provide a testing device and method which will enable one to diagnose retarder performance within a short interval of time and without removing the retarder from the rail. Further, it is desirable to provide a testing device and method which permits a user to test a retarder in the field while standing in an upright position.

SUMMARY OF THE INVENTION

It is one object of the present invention to provide a testing tool which can quickly and accurately check any brand of retarder without a user bending down and crouching over the retarder and without stepping on the retarder.

It is also an object of the present invention to provide a lever-type testing apparatus which employs a load cell or transducer along with an easily readable gauge to measure and display the response of an installed retarder.

It is another object of the present invention to provide a testing device which allows an individual to effectively test a large population of installed retarders faster than any other previously known device.

In one aspect of the present invention, a testing device is provided for checking the resistive force of a retarder installed on a rail of a railway track for reducing the speed of a railcar rolling along the track. The retarder has a hydraulic unit and includes a housing, a cylinder slidably mounted in the housing, a piston rod fixed to the housing, a piston assembly fixed to the piston rod and dividing the cylinder into upper and lower chambers, and valve structure responsive to the flow of hydraulic fluid flowing between the upper chamber and the lower chamber. The testing device is constructed and arranged to allow a user to check the resistive force of the retarder installed upon the railway track while standing in an upright position. The testing device includes a rigid, hollow, center pipe having an upper end provided with a handle, and a lower end provided with a resistive force reading arrangement, such as a load cell, which is engageable with the cylinder. The test device further includes a gauge mounted on the center of the pipe in the vicinity of the handle, and electrically connected with the resistive force reading arrangement for displaying the resistive force of the retarder installed on the railway track. Wiring is disposed within the center pipe and connects the resistive force reading arrangement with the gauge. The lower end of the center pipe includes a stop bar which is engageable with the top portion of the rail. The lower end of the center pipe further includes a head portion for accommodating the resistive force reading arrangement in a recessed manner.

The invention also contemplates a method for checking the resistive force of a retarder installed on a rail of a railway track for reducing the speed of a railcar travelling along the tracks and having a hydraulic unit including a housing, a cylinder slidably mounted in the housing, a piston rod fixed to the housing, a piston assembly fixed to the piston rod and dividing the cylinder into upper and lower chambers, and a valve arrangement responsive to the flow of hydraulic fluid flowing between the upper and lower chambers. The method includes the steps of (a) providing a test device including a handle, a center pipe having an upper end connected to the handle, and a lower end formed with a device for reading the resistive force exerted by the retarder; (b) engaging the resistive force reading device with the cylinder while holding the handle and standing in an upright position over the installed retarder; (c) applying a downward force of the resistive force reading device against the cylinder while standing in the upright position; and (d) displaying the amount of resistive force exerted by the cylinder to the user while standing in the upright position.

In yet another aspect of the invention, there is provided a portable, on-site testing device for checking the resistive force of a retarder installed on a railway track for reducing the speed of a railcar rolling along the track. The retarder is a hydraulic unit including a housing, a cylinder slidably mounted in the housing, a piston rod fixed to the housing, a piston assembly fixed to the piston rod and dividing the cylinder into upper and lower chambers and a valve arrangement responsive to the flow of hydraulic fluid flowing between the upper chamber and the lower chamber. The testing device includes an elongated, hollow, rigid center pipe having an upper end and a lower end. A handle is fixed to the center pipe at the upper end thereof. A resistive force generating structure is connected to the lower end of the center pipe for engagement with the cylinder. The center pipe is sized such that when the resistive force generating structure is engaged with the cylinder, the user grasps the handle while standing in an upright position. The resistive force generating structure includes a head portion having a load cell mounted therein. The resistive force generating structure further includes a stop bar engageable with the top of the rail. A gauge is mounted on the upper end of the center pipe for displaying the resistive force exerted by the cylinder in response to the deflection of the cylinder by the wheel of a railcar travelling on the track.

In the preferred embodiment, the resistive force generating structure is defined by a rail bracket assembly having a pair of parallel rail brackets connected together by a pin, and an elongated bar pivotally connected between the rail brackets. The elongated bar carries a stop block at one end thereof and a load cell at another end thereof. Each rail bracket includes a generally J-shaped arm engageable with a top portion of the rail and a generally L-shaped leg engageable with a lower portion of the rail. With the arms and legs engaged with the rail, a force applied generally perpendicularly to the longitudinal axis of the center pipe will pivot the bar relative to the rail brackets creating a downward force so as to bring the load cell into engagement with the cylinder. The rail bracket assembly thus defines a lever-type connection between the rail and the retarder.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings:

FIG. 1 is a perspective view of a railway yard having tracks equipped with a plurality of distributive retarders;

FIG. 2 is a partial cross sectional view of a distributive retarder shown installed upon the web of a rail;

FIGS. 3A, 3B and 3C are sequential diagrams of a single distributive retarder as it is engaged by a rolling wheel of a railcar travelling beyond a predetermined critical speed;

FIG. 4 is an elevational view of a retarder test device embodying the present invention and shown in an set-up position relative to an installed retarder;

FIG. 5 is a view similar to FIG. 4, but showing the testing device in an operative position relative to the installed retarder; and FIG. 6. Is a partial, sectional view taken on line 6—6 of FIG. 4.

DETAILED DESCRIPTION OF THE INVENTION

Figure 2A:
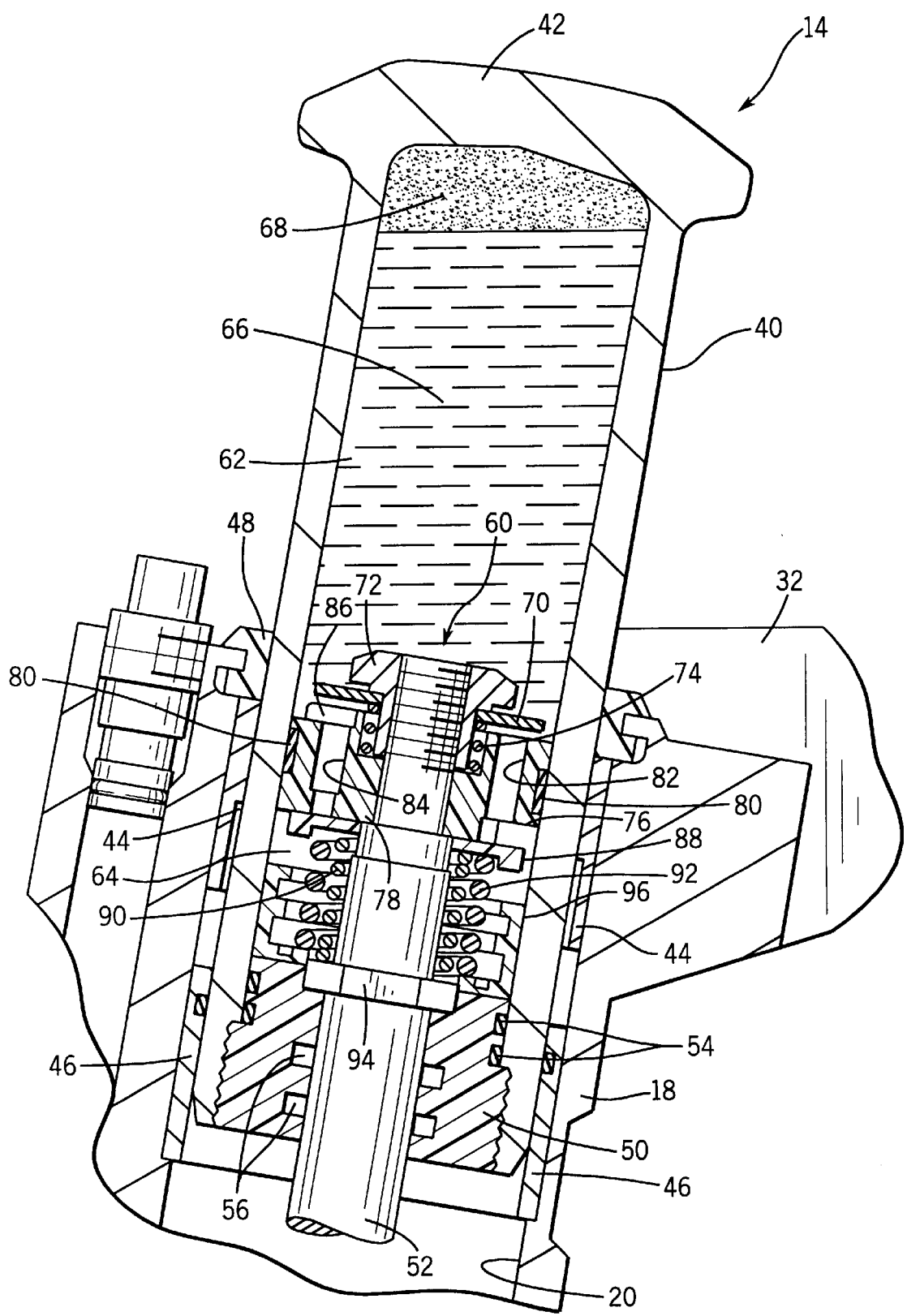
FIG. 2A is an enlarged, partial view similar to FIG. 2, but showing the internal structure of the retarder in more detail.

Referring now to FIG. 1, there is shown a railway classification yard 10 wherein one or more sets of tracks 12 are provided with a plurality of shock absorber-like, distributive retarders 14. As is well known, these retarders 14 are useful in reducing the speed of railcars 16 travelling upon the tracks 12 and have particular application in slowing railcars 16 being shunted into sidings. The description which follows is that of a typical self-contained retarder 14 such as is commercially available from the China TDJ System Research Center of Harbin, China, As seen in FIGS. 2 and 2A, each retarder 14 includes a cast pot or housing 18 having a bore 20 which is open at its upper end 22 and closed at its lower end 24. The bore 20 has an axis 26 which is inclined relative to a vertical plane passing through a web 28 of a rail 30 of a railway track 12 in the yard 10. The housing 18 is provided with a retainer 32 which is fixedly attached to the inner side of the web 28 by a pair of studs and nuts, one of each being illustrated at 34 and 36, respectively. In the installed position shown in FIG. 2, the retarder 14 is mounted in a position suspended over the ballast or rail bed 38. A cylinder 40 is closed and formed with a mushroom-shaped upper end 42, and is slidably and rotatably mounted in top and bottom bearings 44,46 respectively, disposed in the bore 20. A scrape ring 48 is interposed between the housing 18 and the cylinder 40 at the open upper end 22 of the housing 18 to protect the cylinder 40 during movement thereof. The mushroom-shaped end 42 of cylinder 40 is adapted to be engageable with the outer edge of a railcar wheel as the railcar 16 traverses and rolls upon the track 12. As will be understood hereafter, the retarder 14 is specifically designed to support and guide the movement of the sliding cylinder 40 so that it only retards the velocity of the faster moving cars while not altering the speed of the slower running cars.

The opposite end of the sliding cylinder 40 is screw threadedly fitted with a gland 50 formed with a central opening through which an elongated piston rod 52 extends. The gland 50 is provided with suitable outer seals 54 between the inside surface of the cylinder 40 and the outside surface of the gland 50. Similarly, suitable inner seals 56 prevent leakage of hydraulic fluid between the outer surface of piston rod 52 and the inner surface of gland 50. The lower end of the piston rod 52 is secured to the inner, lower end 24 of the housing 18 by a locking pin assembly 58. Both the piston rod 52 and the housing 18 are designed to be stationary, while the cylinder 40 and its attached gland 50 are movably disposed relative to the housing 18. A piston assembly 60 is provided on the upper end of piston rod 52, and divides the bore of the cylinder 40 into an upper chamber 62 and a lower chamber 64. Cylinder 40 is filled with hydraulic fluid or oil 66 up to a certain level in the upper chamber 62. The remainder of the upper chamber 62 is charged with nitrogen gas 68 which functions as a spring for enabling telescopic movement of the cylinder 40 in housing bore 20.

The piston assembly 60 includes an annular, apertured speed valve plate 70 which is biased upwardly in an open position against a nut 72 by a coil spring 74 which, in turn, interacts with a core portion 76 to define a speed control valve. Core portion 76 is retained against an uppermost stepped portion 78 of piston rod 52, and is encircled by support rings 80 to create an effective seal between the upper and lower chambers 62,64. The core portion 76 is formed with a first set of through passages 82, and a second set of through passages 84, the top of which opens into a recessed portion 86 which allows passage of hydraulic fluid from the upper chamber through the passages 84 when the speed valve plate 70 closes against the top of passages 82. An annular, orificed relief valve plate 88 is positioned around the uppermost stepped portion 78 of piston rod 52, and is forced upwardly against the bottom of core portion 76 by an inner spring 90 and an outer spring 92, both of which surround the piston rod 52. The bottom of inner spring 90 is supported against the lowermost stepped portion of piston rod 52 defined by a nut 94. The nut 94 forms an uppermost stop for the gland 50 secured in the lower end 24 of the cylinder 40. A return stroke valve plate 96 for providing telescopic extension of cylinder 40 is also mounted and supported upon nut 94, and is regulated by outer spring 92 to control the upward speed of cylinder 40 once the railcar wheel 98 passes over the mushroom-shaped end 42 of cylinder 40.

It should be understood that the retarder 14 described above which contains precision valves, oil and nitrogen gas at pressure, is preset during manufacture to obtain the desired critical speed control which is generally in the 0 to 11 mile per hour range. Different operating characteristics can be obtained, such as by varying the size of the apertures in the valve plates, the size of the biasing springs, the ratio of the diameter of the piston assembly to the piston rod, and the amount of hydraulic fluid relative to the volume of nitrogen gas.

With reference now to FIGS. 3A–3C, when the speed of a running railcar is below the designed critical speed, the sliding cylinder 40 retracts easily and without resistance. The flow produced from the top portion of the cylinder 40 to the bottom portion through the holes of the speed valve is low, resulting in less pressure deviation to the speed valve plate 70. The hydraulic pressure to the speed valve plate 70 is insufficient to collapse the pre-pressure of the supporting spring 74, therefore the speed valve remains open. The pressure produced from the oil passing through the speed valve is insufficient to cause any resistance, thereby preventing the unit from retarding the railcar wheel 98.

When the speed of a railcar exceeds the designed critical speed, the sliding cylinder 40 is forced down quickly by the wheel 98. The flow produced from the top portion of the cylinder 40 to the bottom portion through the holes of the speed valve is significant, resulting in enough pressure deviation to the speed valve plate 70. The hydraulic pressure on the speed valve plate 70 collapses the supporting spring 74, closing the speed valve rapidly, forcing the nitrogen in the top part of the cylinder to be compressed quickly. This raises the pressure until the relief valve is open. The oil being forced through the orifice plate 88 (relief valve) dissipates the energy.

When the wheel of the wagon passes over the head of the sliding cylinder 40, the return of the cylinder 40 is achieved by expansion of the compressed nitrogen in the top portion of the retarder 14. During this process, the relief valve is closed and the oil in the bottom of the retarder returns to the top through holes located in the speed valve and the gap between the return stroke valve and the relief valve. Due to the throttle effect of the operation, the oil in the bottom can only return to the top at a certain speed which also gives a complementary effect to the sliding cylinder 40. By altering the gap between the return stroke valve and the relief valve, various return speeds are achieved.

As previously discussed in the Background of the Invention, retarders 14 are distributed along the length of the classification tracks 12 to continuously control the maximum acceptable coupling velocity and prevent damage to railcars, as well as excessive wheel lift and derailment. Once the retarders 14 have been secured on the railway tracks 12, there has been no on-site tool that conveniently and safely allows the user to accurately test the amount of resistive force left in an installed retarder 14 without crouching down close to the track. While there exists a spring-loaded lever device, which is cumbersome, awkward and impractical for checking a large population of differently manufactured retarders, a more fundamental method of testing was for an individual to compress retarder 14 with their foot to feel if the retarder possessed the proper resistance. Because of safety concerns, this method, which is also unsafe and inaccurate, has been prohibited in some yards, leaving the user without any viable means to verify whether the retarder 14 is operational as originally installed.

In accordance with the invention, shown in FIGS. 4, 5 and 6, a portable, field testing device 100 is constructed and arranged for conveniently, accurately and safely checking the resistive force of one or more retarders 14 installed upon a railway track 12, while standing in an upright position. Testing device 100 includes a hollow, rigid center pipe 102 provided with a sleeve-like handle 104 at its upper end. An upper end of center pipe 102 is provided with a bracket 106 for supporting a display gauge 108 on the exterior thereof. The lower end of the pipe 102 carries a movable, levertype rail bracket assembly 110 comprised of a pair of rail brackets 112,114 (FIG. 6) connected together in parallel relationship by a fastener or pin 116, and an elongated bar 118 pivotally connected to a pivot pin 119 for movement relative to the rail brackets 112,114. As will be appreciated hereafter, the rail bracket assembly 110 defines a resistive force generating structure which is selectively engageable with the top of cylinder 40. Projecting from the lower, inner end of the bar 118 is a stop block 120 which is engageable and disengageable with the top or crown 122 of the rail 30. Extending from the lower, outer end of bar 118 is a head portion 124 for accommodating a commercially available load cell or transducer 126 therein. Wiring 128 carrying an electrical signal and connecting the display 108 with load cell 126 is routed through and protected within center pipe 102. Each rail bracket 112,114 has a generally J-shaped horizontal arm 130 which is adapted to envelope top and side portions of the rail 30. A horizontally extending finger 132 protrudes from a lower end of the arm 130 and is engageable with a bottom portion of the rail crown 122. Each rail bracket 112,114 also has a generally L-shaped vertical leg 134 integrally formed with a laterally extending foot portion 136 which is engageable against the inside bottom, portion of rail web 28.

The hollow pipe 102 is of a suitable length and width such that a user standing in a substantially upright, set-up position and desiring to the check the resistant force in any single installed retarder 14, grasps the handle 104 and places the rail bracket assembly 110 such that the retarder 14 lies between the rail brackets 112,114, and rail brackets engage the rail 30 as shown in FIGS. 4 and 6. In this set-up position, the pipe 102 and the handle 104 are oriented at an acute angle from the longitudinal axis 26 of the retarder 14, and the bar 118 is pivoted upwardly such that the load cell 126 is spaced above the top 42 of the retarder 14. With testing device 100 in the set-up position of FIG. 4, the user simply applies a force to the handle 104 in the direction of the arrow (that is, generally perpendicularly to the longitudinal axis of the pipe 102) so as to pivot bar 118 and move load cell 126 downwardly to bring load cell 126 into engagement with the top of the retarder 14 and stop block 120 into engagement with the crown 122 of rail 30. Testing device 100 is now in an operative position in which the rail brackets 112,114 will remain locked in engagement with the upper and lower portions of the rail 30. Such motion causes a resistive force generated by the retarder 14 to be conveniently and accurately read via load cell 126 and display gauge 108 in a safe efficient manner.

Once, a retarder 14 has been tested, the testing device 100 is lifted upwardly and placed over another retarder 14 installed on the track 12. It should be appreciated that use of the field testing device 100 requires only a few seconds so that, if desired, testing of hundreds of retarders 14 installed on a set of tracks can be accomplished in a relatively short interval without expending hours of maintenance time. Further, upkeep costs are better controlled since the testing device 100 requires operation by only one person and is operable without moving parts. With the invention, no longer does the user need to bend down over the retarder 14, thus avoiding stress to the back that is associated with working in this position. In addition, the head portion 118 of the test device 100 is shaped so as to accommodate many different brands and types of retarders 14. Unlike the prior art, use of testing device 100 does not entail clearing any ballast under the base of the rail. The testing device 100 allows for on-site preventive maintenance to ensure that the retarders 14 maintain their original braking characteristics. Upon the accurate detection of a "bad" retarder 14, the unacceptable braking device is removed from service in favor of a replacement retarder 14.

It should be appreciated that the testing device 100 relies upon a lever-type motion which allows the load cell 126 to be applied to the retarder 14 with less effort than if a simple, straight downward force were applied. This design is particularly advantageous when a worker is expected to test hundreds of retarders within a working day.

While the invention has been described with reference to a preferred embodiment, those skilled in the art will appreciate that certain substitutions, alterations and omissions may be made without departing from the spirit thereof. Accordingly, the foregoing description is meant to be exemplary only, and should not be deemed limitative on the scope of the invention set forth with the following claims.

We claim:

1. A testing device for checking a resistive force of a retarder installed on a rail of a railway track for reducing a speed of a railcar rolling along the track, and having a hydraulic unit including a housing, a cylinder slidably mounted in the housing, a piston rod fixed to the housing, a piston assembly fixed to the piston rod and dividing the cylinder into upper and lower chambers and valve structure responsive to a flow of hydraulic fluid flowing between the upper chamber and the lower chamber, the testing device comprising:

an upwardly extending, hollow rigid center pipe having an upper end provided with a handle, and a lower end provided with a resistive force reading arrangement engageable with the cylinder, the lower end including a rail bracket assembly which is engageable with a top portion of the rail, wherein the testing device allows a user to check the resistive force of a retarder installed upon the railway track while standing in an upright position.

2. The testing device of claim 2, wherein the resistive force reading arrangement is a load cell.

3. The testing device of claim 2, including a gauge mounted on the center pipe in the vicinity of the handle, and electrically connected with the resistive force reading arrangement for displaying the resistive force of the retarder installed on the railway track.

4. The testing device of claim 3, including wiring disposed within the center pipe and connecting the resistive force reading means with the gauge.

5. The testing device of claim 1, wherein the lower end of the center pipe further includes a head portion for accommodating the resistive force reading means.

6. The testing device of claim 1, wherein the resistive force reading means is recessed within the head portion.

7. A method for checking resistive force of a retarder installed on rail of a railway track for reducing a speed of a railcar having a wheel traveling along the tracks and having a hydraulic unit, including a housing, a cylinder slidably mounted in the housing, a piston rod fixed to the housing, a piston assembly fixed to the piston and dividing the cylinder into upper and lower chambers and valve structure responsive to a flow of fluid flowing between the upper and lower chambers, the method comprising the steps of:

(a) providing a test device including a handle, a center pipe having an upper end connected to the handle and a lower end formed with an arrangement for reading the resistive force exerted by the retarder;

(b) engaging the resistive force reading arrangement with the cylinder while holding the handle and standing in an upright position over the installed retarder;

(c) applying a downward force of the resistive force reading arrangement against the cylinder while standing in the upright position; and (d) displaying an amount of resistive force exerted by the cylinder in response to deflection of the cylinder by the wheel of a railcar traveling upon the track to a user while standing in the upright position.

8. A portable on-site testing device for checking a resistive force of a retarder installed on a rail of a railway track for reducing the speed of a railcar having a wheel rolling along the track, and having a hydraulic unit including a housing, a cylinder slidably mounted in the housing, a piston rod fixed to the housing, a piston assembly fixed to the piston rod and dividing the cylinder into upper and lower chambers, and valve structure responsive to the flow of hydraulic fluid flowing between the upper chamber and lower chamber, the testing device comprising:

an elongated, hollow, rigid center pipe having an upper end and a lower end;

a handle fixed to the center pipe at the upper end thereof; and a resistive force generating structure connected to the lower end of the center pipe for engagement with the cylinder, the resistive force generating structure being defined by a rail bracket assembly having a pair of parallel rail brackets connected together by a pin, and an elongated bar pivotally connected between the rail brackets, the center pipe being sized such that when the resistive force generating structure is engaged with the cylinder, a user holds the handle while standing in an upright position.

9. The testing device of claim 8, wherein the resistive force generating structure includes a head portion having a load cell mounted therein.

10. The testing device of claim 9, wherein the resistive force generating structure further includes a stop block engageable with a top of the rail.

11. The testing device of claim 10, wherein the resistive force generating structure further includes a gauge mounted on the upper end of the center pipe for displaying the resistive force exerted by the cylinder in response to deflection of the cylinder by the wheel of a railcar travelling upon the track.

12. The testing device of claim 8, wherein the elongated bar carries a stop block at one end thereon.

13. The testing device of claim 12, wherein the elongated bar also carries a load cell at another end thereof.

14. The testing device of claim 8, wherein the retarder is adapted to be disposed between the rail brackets.

15. The testing device of claim 13, wherein each rail bracket includes a generally J-shaped arm engageable with a top portion of the rail, and a generally L-shaped leg engageable with a lower portion of the rail.

16. The testing device of claim 15, wherein with the arms and legs engaged with the rail, a force applied generally perpendicularly to the longitudinal axis of the center pipe will pivot the bar relative to the rail brackets creating a downward force so as to bring the load cell into engagement with the cylinder.

17. The testing device of claim 8, wherein the rail bracket assembly defines a lever-type connection between the rail and the retarder.

* * * * *

UNITED STATES PATENT AND TRADEMARK OFFICE
CERTIFICATE OF CORRECTION

PATENT NO. : 6,216,525 B1
DATED : April 17, 2001
INVENTOR(S) : John J. Bernd, Richard C. Bohme It is certified that error appears in the above-identified patent and that said Letters Patent is hereby corrected as shown below:

Column 8, claim 2,
Line 4, at "claim", cancel "2" and substitute therefor -- 1 --;

Column 8, claim 7,
Line 20, at "on" insert -- a --.

Signed and Sealed this

Eighteenth Day of December, 2001

Attest:

JAMES E. ROGAN
*Attesting Officer*       *Director of the United States Patent and Trademark Office*